(12) United States Patent
Fansler et al.

(10) Patent No.: US 7,307,106 B2
(45) Date of Patent: Dec. 11, 2007

(54) PHOTOCURABLE MICHAEL ADDITION POLYMERS

(75) Inventors: Duane D. Fansler, Dresser, WI (US); Kevin M. Lewandowski, Inver Grove Heights, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 349 days.

(21) Appl. No.: 11/009,588

(22) Filed: Dec. 10, 2004

(65) Prior Publication Data

US 2006/0128825 A1 Jun. 15, 2006

(51) Int. Cl.
C08G 63/00 (2006.01)
C08G 71/04 (2006.01)
C08G 75/00 (2006.01)
C08F 2/48 (2006.01)

(52) U.S. Cl. .......................... 522/34; 522/35; 522/42; 522/44; 522/46; 522/36; 522/178; 522/182; 522/904; 522/905; 528/220; 528/222; 528/224; 528/226; 528/228

(58) Field of Classification Search .................. 522/35, 522/34, 36, 42, 44, 46, 178, 182, 904, 905; 528/220, 222, 224, 226, 228
See application file for complete search history.

(56) References Cited

U.S. PATENT DOCUMENTS

| | | | |
|---|---|---|---|
| 2,730,517 A | 1/1956 | Vogel et al. | |
| 4,262,072 A | 4/1981 | Wendling et al. | |
| 4,795,787 A * | 1/1989 | Walz ...................... | 525/328.2 |
| 4,871,822 A | 10/1989 | Brindöpke et al. | |
| 5,132,367 A | 7/1992 | Chan | |
| 5,180,756 A | 1/1993 | Rehmer et al. | |
| 5,256,473 A | 10/1993 | Kotani et al. | |
| 5,459,178 A | 10/1995 | Chan et al. | |
| 5,466,863 A | 11/1995 | Heidt et al. | |
| 5,506,279 A | 4/1996 | Babu et al. | |
| 5,741,829 A * | 4/1998 | Reich et al. ................... | 522/35 |
| 5,902,836 A | 5/1999 | Bennett et al. | |
| 6,025,410 A | 2/2000 | Moy et al. | |
| 6,245,922 B1 | 6/2001 | Heilmann et al. | |
| 6,296,986 B1 * | 10/2001 | Illsley et al. ............. | 430/281.1 |
| 6,673,851 B2 * | 1/2004 | Moy et al. ................... | 522/173 |
| 6,924,324 B2 * | 8/2005 | Gaudl et al. ................ | 522/182 |
| 7,041,749 B2 * | 5/2006 | Dammann et al. .......... | 525/532 |
| 2005/0080162 A1 * | 4/2005 | Narayan-Sarathy et al. | 523/160 |
| 2005/0081995 A1 * | 4/2005 | Beckley et al. ............. | 156/325 |
| 2005/0245721 A1 * | 11/2005 | Beckley et al. ............. | 528/271 |
| 2005/0261388 A1 * | 11/2005 | Gould et al. .................... | 522/8 |

FOREIGN PATENT DOCUMENTS

| | | |
|---|---|---|
| EP | 0 227 454 A2 | 7/1987 |
| EP | 1 342 738 A1 | 9/2003 |
| EP | 1 403 708 A2 | 3/2004 |
| WO | WO 95/16749 A1 | 6/1995 |
| WO | WO 2005/104694 A2 | 11/2005 |
| WO | WO 2005/108452 A2 | 11/2005 |

OTHER PUBLICATIONS

Sheridan et al., "Novel Resins That Cure Without Added Photoinitiator", RadTech, (2000), pp. 462-474.

Trumbo, "Michael Addition Polymers from 1,4 and 1,3 benzenedimethanol diacetoacetates and tripropylene glycol diacrylate", Polymer Bulletin, (1991), pp. 265-270, vol. 26.

Trumbo, "Michael Addition Polymers from bisacetoacetates, II. 2,2-dimethyl-1,3-bis(acetoacetyl)-propanediol and N,N'-bis(acetoacetyl)-1,4-piperazine", Polymer Bulletin, (1991), pp. 481-485, vol. 26.

Clemens et al., "A Comparison of Catalysts for Crosslinking Acetoacetylated Resins via the Michael Reaction", Journal of Coatings Technology, (Mar. 1989), pp. 83-91, vol. 61, No. 770.

Rector et al., "Applications for Acetoacetyl Chemistry in Thermoset Coatings", Journal of Coatings Technology, (Apr. 1989), pp. 31-37, vol. 61, No. 771.

Li et al., "Use of Formic Acid in Controlling the Rate of the Michael Addition Reaction in Base Catalyzed, Thermally Cured Acetoacetylated Acrylic/TMPTA Coatings", Journal of Coatings Technology, (Jun. 1993), pp. 63-69, vol. 65, No. 821.

Rector et al., "Synthesis of Acetoacetylated Resins and Applications for Actoacetate Chemistry in Thermoset Coatings", Surface Coatings Australia, (Sep. 1989), pp. 6-15.

Witzeman et al., "Transacetoacetylation with *tert*-Butyl Acetoacetate: Synthetic Applications", J. Org. Chem., (1991), pp. 1713-1718, vol. 56, No. 5, American Chemical Society.

Moszner et al., "Reaction Behaviour of Monomeric β-ketoesters, 4[a)], Polymer Network Formation by Michael Reaction of Multifunctional Acetoacetates with Multifunctional Acrylates", Macromol. Rapid Commun., (1995), pp. 135-138, vol. 16.

Gladyshev et al., "Polymerization at Advanced Degrees of Conversion", (1970), Israel Program for Scientific Translations Ltd., Jerusalem.

Rector et al., "Applications for the Acetoacetyl Functionality in Thermoset Coatings", Proceedings of the Fifteenth Water-Borne and Higher-Solids Coatings Symposium, (Feb. 3-5, 1988), pp. 68-93.

\* cited by examiner

*Primary Examiner*—Susan Berman
(74) *Attorney, Agent, or Firm*—Kent S. Kokko

(57) ABSTRACT

A curable composition is described comprising a Michael donor component, a polyacryl component, and a monoacryl component, where at least one of the Michael donor or monoacryl components comprises a pendent photoinitiator group. A Michael addition polymer that is the Michael addition reaction product of these components is also described.

25 Claims, No Drawings

PHOTOCURABLE MICHAEL ADDITION POLYMERS

FIELD OF THE INVENTION

The present invention is directed to Michael addition polymers having pendent or terminal photoinitiator groups.

BACKGROUND

The chemistry of acetoacetate compounds, and the Michael addition to acrylates has been described. For example, Mozner and Rheinberger reported the Michael addition of acetoacetates having a β-dicarbonyl group to triacrylates and tetracrylates to form gel products. See Macromolecular Rapid Communications 16 135-138 (1995).

U.S. Pat. No. 6,025,410 notes that the stoichiometry of the Michael donor to the Michael acceptor is critical to controlling the molecular weight. The reference teaches that certain soluble liquid uncrosslinked oligomers, made by one step Michael addition of acetoacetates to multi-acrylates, can be further crosslinked using ultraviolet light without using photoinitiators. If proportions below the claimed ranges are used, crosslinked gels or solid products are made which are not useful because only un-gelled, uncrosslinked liquid oligomers will further crosslink without adding photoinitiators. The described liquid oligomer compositions, since they are liquids, can readily be applied to various substrates using conventional coating techniques such as roll or spray prior to ultraviolet light cure.

U.S. Pat. No. 5,132,367 describes NCO-free resins and cured products thereof. The cured products are obtained by a Michael reaction of an acetoacetylated (meth)acrylic resin or an acetoacetylated polyester and an NCO-free polyurethane having at least two (meth)acrylic end groups.

EP 227454 discloses a process for preparing a cured polymer involving the Michael reaction of an acetoacetylated polyol and a poly α,β-unsaturated ester. The obtained cured products are said to exhibit excellent adhesion, excellent solvent resistance, excellent gloss retention, good flexibility and hardness.

U.S. Pat. No. 5,459,178 describes mixtures comprising an acetoacetate ester, an α,β-ethylenically unsaturated monomer and a liquid tertiary amine catalyst. A cured system is obtained by reacting these components. The acetoacetate ester used is prepared by transesterification of polyhydroxyl compound having an average of at least two hydroxy groups with an alkylacetoacetate.

U.S. Pat. No. 4,871,822 discloses a Michael reaction of olefinically unsaturated compounds with compounds containing at least two active hydrogen atoms for two component lacquers. As olefinically unsaturated compounds there are considered compounds having at least two 60 ,β-unsaturated carbonyl groups. There are a large number of Michael donors including acetoacetylated polyols or polyamines and such compounds as e.g. acetylacetone or benzoylacetone.

David L. Trumbo in Polymer Bulletin 26, pages 265-270 (1991) discloses Michael addition polymers obtained from 1,4- and 1,3-benzenedimethanol diacetoacetates and tripropylene glycol diacrylate. The reference describes that in case the reactants are used in stoichometric amounts of the reactive groups, gelation of the system is observed. In another paper (Polymer Bulletin 26, pages 481-485 (1991)) the same author described Michael addition polymers obtained from the reaction of a bis(acetoacetyl) amide or an aliphatic acetoacetate and a di-acrylate comonomer.

WO 95/16749 describes a water-borne curable composition that comprises an acetoacetylated polymer in the form of an aqueous solution, dispersion or emulsion and a polyacrylate that has at least two (meth)acrylate end groups. According to this publication, such composition is stable even in the presence of a catalyst until the water is evaporated from the system.

The use of acetoacetyl chemistry, in particular the use of acetoacetylated resin, in thermosetting systems is further described in Journal of Coatings Technology Vol. 61 no. 771 page 31 to 37; Journal of Coatings Technology Vol. 65 no. 821 page 63 to 69; Surface Coatings Australia, September 1989 page 6 to 15; and Journal of Coatings Technology Vol. 61 no. 770 page 83 to 91.

SUMMARY

The present invention provides a curable composition comprising a Michael donor component, a polyacryl component, and optionally a monoacryl component. At least one of the Michael donor or monoacryl components comprises a pendent photoinitiator group. In another aspect, the invention provides a Michael addition polymer having pendent and/or terminal photoinitiator groups that is the reaction product of these components, (i.e. a "Michael adduct"). In another aspect, the Michael addition polymer may have pendent polymerizable groups in addition to the photoinitiator groups.

In another aspect, the invention provides a method for preparing a Michael addition polymer of controlled molecular weight by reacting the aforementioned components. The resulting Michael addition polymer may be further crosslinked by photopolymerization of the pendent unsaturated polymerizable groups (if present). In another embodiment, the Michael addition polymer may be crosslinked by photopolymerization of an additional crosslinking agent.

The invention overcomes the problems in the art by using a monoacryl monomer to regulate and control the molecular weight of the resulting polymers and to provide a Michael addition polymer having pendent and/or terminal photoinitiator groups, rendering it photocurable. Heretofore, the molecular weight of Michael adduct polymers was controlled by the stoichiometry of the donor component and the polyacryl component. Thus the product polymer has at least one photoinitiator group that may be used for further crosslinking.

The compositions are useful, for example, for abrasion resistant coatings, ink receptors, barrier films, compatibilizers for polymer blends, refractive index tunable materials, optical coatings, coatings for medical and electronic components and hydrophilic gels.

In some embodiments, curable compositions according to the present invention are coated on a substrate and at least partially polymerized to form a coating. Accordingly, in another aspect, the present invention provides a composite article comprising a substrate having thereon a coating preparable by at least partially polymerizing the curable composition. As used herein:

"acryl" is used in a generic sense and includes not only derivatives of acrylic acid, but also amine, thiol and alcohol derivatives of acrylic acid, respectively;

"(meth)acryl" is used in the generic sense and not only derivatives of acrylic and methacrylic acid, but also amine, thiol and alcohol derivatives of acrylic acid, respectively;

"alkyl" and "alkylene" mean the monovalent and divalent residues remaining after removal of one and two hydrogen atoms, respectively, from a linear or branched chain hydrocarbon having 1 to 20 carbon atoms;

"lower alkyl" means $C_1$ to $C_4$ alkyl;

"aryl" and "arylene" mean the monovalent and divalent residues remaining after removal of one and two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$.

"curable" means that a coatable material can be transformed into a solid, substantially non-flowing material by means of chemical reaction (e.g. Michael addition) crosslinking, radiation crosslinking, or the like.

"polyacryl" means a compound having two or more acryl groups that may function as Michael acceptors.

DETAILED DESCRIPTION

The present invention provides a curable composition comprising a Michael donor component, a polyacryl component, and optionally a monoacryl component, wherein at least one of the Michael donor or monoacryl components comprises a pendent photoinitiator group.

A Michael donor preferably corresponds to one of formulas (I) to (III):

  (I)

  (II)

  (III)

wherein $R^1$ represents hydrogen, an alkyl group or an aryl group;

$W^1$ and $W^2$ each independently selected from a cyano group, a nitro group, an alkyl carbonyl group, an alkoxy carbonyl group, an aryl carbonyl group, an aryloxy carbonyl group, an amido group, and a sulphonyl group;

P represents a mono- or multi-valent organic residue, or the reaction residue of a polyol or polyamine in an acetoacetylation reaction, or in some embodiments P may be P*, where the organic residue P is substituted by a photoinitiator group (such as a radiation-sensitive α-cleaving group or a hydrogen abstraction group); and x represents an integer of 1 or more when $R^1$ is hydrogen, and x is two or more when $R^1$ represents an alkyl group or an aryl group. Thus the number of donor group equivalents for each of the compounds of Formulas I, II and III is two or greater.

One useful class of Michael donors according to formula (I) are acetoacetylated polyols, which may be represented by Formula I where P is the residue of a polyol. The acetoacetylated polyol can be prepared by transesterification with an alkyl acetoacetate. A preferred transesterification reagent for this purpose is tert-butyl acetoacetate described by J. S. Witzeman and W. D. Nottingham in J. Org. Chem., 1991, (56), pp. 1713-1718. The polyols being acetoacetylated in this invention preferably have two or more hydroxy groups. The conversion of hydroxy groups to acetoacetate groups should be between 80 mol % and 100 mol % and more preferably between 85 mol % and 100%.

Suitable acetoacetylated polyols are, for example, those obtained from one of the following polyols: polyethylene glycol, polypropylene glycol, polybutylene glycol, pentaerythritol, trimethylolethane, trimethylol propane, bis-trimethylol propane, K 55™ (available from Bayer AG) which is a condensation product of trimethylolpropane and propyleneoxide, dipentaerythritol, castor oil, glycerine, dipropyleneglycol, N,N,N'N'-tetrakis(2-hydroxypropyl)ethylendiamine, neopentylglycol, propanediol, butanediol, diethyleneglycol and the like. One or more of the hydroxyl end groups of such polyols may be acetoacetylated. In some embodiments it may be advantageous to acetoacetylate one end group, and to functionalize the other groups with an ethylenically unsaturated free-radically polymerizable group, such as an allyl group, a vinyl group or a methacryl group.

Where a hydrophilic Michael addition polymer is desired, an acetoacetylated poly(alkylene oxide) may be used. The functional groups terminating the poly(alkylene oxide) may include hydroxy groups, and amine groups, which may be acetoacetylated as previously described. Poly(ethylene oxide), poly(propylene oxide), poly(ethylene oxide-propylene oxide), and combinations thereof may be acetoacetylated at one or both terminal ends.

Lower functionalised acetoacetylated polyols allow a more selective and better control of cross-linking than higher functionalised acetoacetylated polyols. Preferably, an acetoacetylated polyol in connection with this invention has an equivalent weight of less than 300 g/mol. A preferred range of equivalent weight of an acetoacetylated polyol in connection with this invention is between 30 g/mol and 5000 g/mol.

Examples of Michael donors according to formula (II) are e.g. compounds of the type p-$CH_3C_6H_4$—$SO_2NHCO_2$-P' wherein P' represents the residue of a polyol such as e.g. pentaerythritol, trimethylolpropane, 1,6-hexanediol, ditrimethylolpropane, propanediol, diethyleneglycol and the like.

Examples of compounds according to formula (III) are NC—$CH_2$—CN, $CH_3SO_2CH_2$CN, $CF_3$—C(O)—$CH_2$—C(O)—$CF_3$, $CF_3$—C(O)—$CH_2$—C(O)—$OC_2H_5$, p-$CH_3C_6H_4SO_2CH_2SO_2CH_3$, $C_6H_5$—C(O)—$CH_2$—$SO_2CH_3$, $(CH_3O_2CCH_2)_2SO_2$, p-$O_2NC_6H_4CH_2CN$, and the like. Further examples may be found in U.S. Pat. No. 5,256,473.

With respect to Formulas I, II, and III, any of P, $W^1$ or $W^2$ may be further substituted with an ethylenically unsaturated free-radically polymerizable group, such as methacryl groups, vinyl groups or allyl groups. As such groups are unreactive in a Michael addition, they may be subsequently free-radically polymerized, via the pendent or terminal photoinitiator groups. For example $W^1$ (or $W^2$) may be —C(O)—O—$C_nH_{2n}$—O—C(O)—C($CH_3$)=$CH_2$, —C(O)—O—$C_nH_{2n}$—O—$CH_2$—CH=$CH_2$, or —C(O)—O—$C_nH_{2n}$—O—CH=$CH_2$, where n=1-10. Similarly, P may be substituted with —C(O)—O—$C_nH_{2n}$—O—C(O)—C($CH_3$)=$CH_2$, —C(O)—O—$C_nH_{2n}$—O—$CH_2$—CH=$CH_2$, —C(O)—O—$C_nH_{2n}$—O—CH=$CH_2$, —O—$C_nH_{2n}$—O—C(O)—C($CH_3$)=$CH_2$, —O—$C_nH_{2n}$—O—$CH_2$—CH=$CH_2$, or —O—$C_nH_{2n}$—O—CH=$CH_2$, where n=1-10.

Useful Michael donors further substituted with an ethylenically unsaturated polymerizable group include 2-acetoacetoxyethyl methacrylate, and allyl acetoacetate.

With respect to Formulas I and II, P may be P*, comprising a photoinitiator group. Thus the Michael donor may be an acetoacetylated photoinitiator, which may be prepared by transesterification with an alkyl acetoacetate. A preferred transesterification reagent for this purpose is tert-butyl acetoacetate described supra. Useful photoinitiators that may be acetoacetylated are described below.

A preferred type of Michael donor corresponding to formula (III) for use in this invention corresponds to the following formula (IV):

wherein $R^2$ and $R^3$; each independently represent an aryloxy group, an alkoxy group, an alkyl group or an aryl group.

A Michael donor according to formula (III) and in particular formula (IV) are preferred because they are generally less costly than e.g. an acetoacetylated polyol which requires an acetoacetylation of a polyol as described above. Moreover, this acetoacetylation involves a transesterification during which an alcohol is formed as a byproduct. Preferred Michael donors according to formula (IV) are those wherein $R^2$ and $R^3$; are independently selected from an alkyl such as e.g. methyl, ethyl, propyl, an aryl such as e.g. a phenyl, an alkoxy group such as e.g. a methoxy, an ethoxy, a t-butoxy or an aryloxy group such as e.g. a phenoxy group. Examples of compounds according to formula (IV) are acetylacetone, methylacetoacetate, ethylacetoacetate, methyl malonate, ethyl malonate, t-butyl acetoacetate, and the like.

Useful polyacryl compounds include those of the general formula:

wherein each Z independently represents —S—, —O—, or —$NR^5$—, where each $R^5$ independently represents H, an alkyl group having from 1 to 6 carbon atoms;

Each $R^4$ independently represents a polyvalent organic group having a valence of z, which can be cyclic, branched, or linear, aliphatic, aromatic, or heterocyclic, having carbon, hydrogen, nitrogen, nonperoxidic oxygen, sulfur, or phosphorus atoms, $R^4$ may be further substituted by one or more ethylenically unsaturated free-radically polymerizable group, such as methacryl groups, vinyl groups or allyl groups;

each z independently represents an integer greater than or equal to 2.

In one embodiment, $R^4$ may be a polyvalent organic group having a valence of at least 2. Examples of polyvalent groups $R^4$ include methylene (i.e. —$CH_2$—); ethylene; propylene, butylene, pentylene, hexylene, heptylene, etc, cyclohexylene, and phenylene. and all isomers thereof Further details regarding the $R^4$ groups may be had with reference to the following useful polyacryl compounds.

Useful polyacryl compounds include, for example, acrylate monomers selected from the group consisting of (a) diacryl containing compounds such as 1,3-butylene glycol diacrylate, 1,4-butanediol diacrylate, 1,6-hexanediol diacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, cyclohexanedimethanol diacrylate, diethylene glycol diacrylate, dipropylene glycol diacrylate, bisphenol-A diacrylate, ethoxylated bisphenol-A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate; (b) triacryl containing compounds such as glycerol triacrylate, ethoxylated triacrylates (e.g., ethoxylated trimethylolpropane triacrylate, pentaerythritol triacrylate, propoxylated triacrylates (e.g., propoxylated glyceryl triacrylate, propoxylated trimethylolpropane triacrylate, tris(2-hydroxyethyl)isocyanurate triacrylate; (c) higher functionality acryl-containing compounds such as ditrimethylolpropane tetraacrylate, dipentaerythritol pentaacrylate, ethoxylated pentaerythritol tetraacrylate, pentaerythritol tetraacrylate, caprolactone modified dipentaerythritol hexaacrylate; (d) oligomeric acryl compounds such as, for example, urethane acrylates, polyester acrylates, epoxy acrylates; polyacrylamide analogues of the foregoing; and combinations thereof.

Such compounds available from vendors such as, for example, Sartomer Company, Exton, Pa.; UCB Chemicals Corporation, Smyrna, Ga.; and Aldrich Chemical Company, Milwaukee, Wis. Additional useful acrylate materials include hydantoin moiety-containing polyacrylates, for example, as described in U.S. Pat. No. 4,262,072 (Wendling et al.).

Other useful polyacryl compounds also include, for example, free-radically polymerizable acrylate oligomers and polymers having pendant (meth)acryl groups wherein at least two of the (meth)acryl groups is an acryl group.

Useful acrylate oligomers include acrylated polyether and polyester oligomers. Where a hydrophilic Michael addition polymer is desired, a polyacryl poly(alkylene oxide) may be used. The functional groups terminating the poly(alkylene oxide) may include hydroxy groups, and amine groups, which may be acrylated. Poly(ethylene oxide), poly(propylene oxide), poly(ethylene oxide-propylene oxide), and combinations thereof may be acrylated at one or both terminal ends.

Useful acrylated polyether oligomers include polyethylene glycol diacrylates available, for example, under the trade designations "SR259" and "SR344" from Sartomer Company. Acrylated polyester oligomers are available, for example, under the trade designations "EBECRYL 657" and "EBECRYL 830" from UCB Chemicals Corporation.

Other useful acrylate oligomers include acrylated epoxies, for example, diacrylated esters of epoxy-functional materials (e.g., diacrylated esters of bisphenol A epoxy-functional material) and acrylated urethanes. Useful acrylated epoxies include, for example, acrylated epoxies available under the trade designations "EBECRYL 3500", "EBECRYL 3600", "EBECRYL 3700", and "EBECRYL 3720" from UCB Chemicals Corporation. Useful acrylated urethanes include, for example, acrylated urethanes available under the trade designations "EBECRYL 270", "EBECRYL 1290", "EBECRYL 8301", and "EBECRYL 8804" from UCB Chemicals Corporation.

With respect to the useful polyacryl compounds presented above, it will be understood that the corresponding amides or thioesters are also useful. Preferably, the multifunctional ethylenically unsaturated ester of acrylic acid is a nonpolyethereal multifunctional ethylenically unsaturated ester of acrylic acid.

The multifunctional ethylenically unsaturated monomer is preferably an ester of acrylic acid. It is more preferably selected from the group consisting of a difunctional ethylenically unsaturated ester of acrylic, a trifunctional ethylenically unsaturated ester of acrylic, a tetrafunctional ethylenically unsaturated ester of acrylic, and a combination thereof. Of these, difunctional and trifunctional ethylenically unsaturated esters of acrylic acid are more preferred.

Preferred polyacryl compounds are multifunctional ethylenically unsaturated esters of acrylic acid and can be described by the formula:

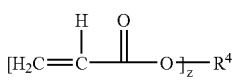
(Va)

wherein R⁴ is a polyvalent organic group, which can be cyclic, branched, or linear, aliphatic, aromatic, or heterocyclic, having carbon, hydrogen, nitrogen, nonperoxidic oxygen, sulfur, or phosphorus atoms. R⁴ may have a molecular weight of greater than 14, and up to 1000, and may be further substituted by one or more ethylenically unsaturated free-radically polymerizable group, such as methacryl groups, vinyl groups or allyl groups;

z is an integer designating the number of acrylic groups in the ester and z has a value of 2-6 (more preferably z has a value of 2-5, most preferably 2, or where a mixture of polyacrylates are used, z has an average value of about 2).

Examples of suitable multifunctional ethylenically unsaturated esters of acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid esters of tris(hydroxyethyl)isocyanurate; the tetraacrylic acid esters of aliphatic triols, such as 1,2,3,4-butanetetrol, 1,1,2,2-tetramethylolethane, 1,1,3,3-tetramethylolpropane, and pentaerythritol tetraacrylate; the pentaacrylic acid and pentamethacrylic acid esters of aliphatic pentols such as adonitol; the hexaacrylic acid esters of hexanols such as sorbitol and dipentaerythritol; the diacrylic acid esters of aromatic diols such as resorcinol, pyrocatechol, bisphenol A, and bis(2-hydroxyethyl)phthalate; the triacrylic acid ester of aromatic triols such as pyrogallol, phloroglucinol, and 2-phenyl-2,2-methylolethanol; and the hexaacrylic acid esters of dihydroxy ethyl hydantoin; and mixtures thereof.

There is a differential reactivity between acryl and other ethylenically unsaturated polymerizable groups (such as methacryl, vinyl or allyl groups) with respect to Michael-type addition. Michael-type addition typically occurs easily with acryl groups (e.g., combination of a reactive Michael donor compound with a compound having an acryl group, optionally with mild heating and in the presence of a basic catalyst, typically results in spontaneous Michael-type addition), but may occur only with difficulty if at all, in the case of methacryl, allyl or vinyl groups.

For this reason, the polyacryl component typically has at least two acryl group (e.g., as part of acryloxy or acrylamido functionality), although the polyacryl compound may also have additional ethylenically unsaturated groups such as methacryl groups (e.g., as part of methacrylate or methacrylamido functionality), vinyl groups or allyl groups. Such groups that are unreactive in Michael additions may be advantageously used to crosslink the Michael addition polymer by means of the photoinitiator group that is pendent or terminal. Advantageously, a composition may be prepared in which Michael addition occurs through the acryl groups to form a Michael adduct, leaving photopolymerizable groups unreacted. Such unreacted methacryl groups may be subsequently photopolymerized.

The monoacryl component provides two benefits to the polymers prepared from the curable composition: control of molecular weight and incorporation of a functional group (e.g. a photoinitiator group for subsequent crosslinking) on the terminus of the polymer. Heretofore, the molecular weights of polymers derived from acetoacetates and diacrylates, were controlled by the stoichiometry of one of the components. The monoacryl component having a photoinitiator group provides for a "dual-cure" composition in which the Michael donor component, the polyacryl component and the monoacryl component are first polymerized by Michael addition, the subsequently crosslinked by photopolymerization.

The composition may comprise monoacryl compounds having a photoinitator group. Such monoacryl compounds are reactive in the Michael reaction producing a Michael adduct having the residue of the monoacryl component at the chain termini. Preferred photoinitiator monomers include Michael addition reactive, ethylenically unsaturated compounds having the functionality represented by the structure:

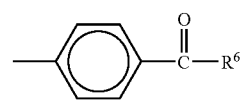
(Formula VI)

wherein R⁶ is

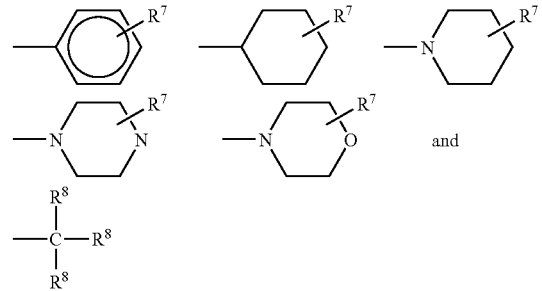

wherein R⁷ is H or a $C_1$ to $C_6$ alkyl group, each R⁸ is independently a hydroxyl group, a phenyl group, a $C_1$ to $C_6$ alkyl group, or a $C_1$ to $C_6$ alkoxy group.

The monoacryl compounds having a photoinitiator groups may be of the general formula:

Formula VII

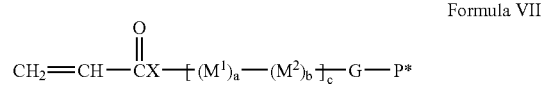

X is —O— or —NR⁹—;

R⁹ is H or a $C_1$ to $C_4$ alkyl group, preferably H or a methyl group;

m is 0 or an integer from 1 to 5;

a, b, and c are independently 0 or 1;

M¹ is $C(R^9)_2$ or $Si(R^9)_2$, wherein each R⁹ is independently H or a $C_1$ to $C_4$ alkyl group;

$M^2$ is O, $NR^9$, C(O), C(O)O, $C(O)NR^9$, or $OC(O)NR^9$, wherein each $R^9$ is independently
H or a $C_1$ to $C_4$ alkyl group;
G is a covalent bond, $(CH_2)_d$, or $(CH_2)_dO$ where d is an integer from 1 to 4, preferably from 1 to 2;
P* is a photoinitiator group, such as the radiation-sensitive α-cleaving group of Formula VI (supra).

In another embodiment the various compounds from which P* can be derived are aromatic ketones. Such ketones are known to be "hydrogen abstracting agents". When activated by absorption of ultraviolet light, these P* groups can act to crosslink the Michael adduct. Thus, P* is a moiety The hydrogen abstracting agents can be prepared by the ring-opening of an electrophilic 2-alkenyl azlactone compound and simultaneous reaction with a nucleophile-substituted aromatic ketone. Suitable nucleophiles include hydroxyl, primary amine, secondary amine, and thiol groups. Such monoacryl photoinitiators are taught in U.S. Pat. No. 6,245,922 (Heilmann et al.) incorporated herein by reference.

Particularly useful monoacryl compounds having a photoinitiator group include the following compounds:

TABLE 1

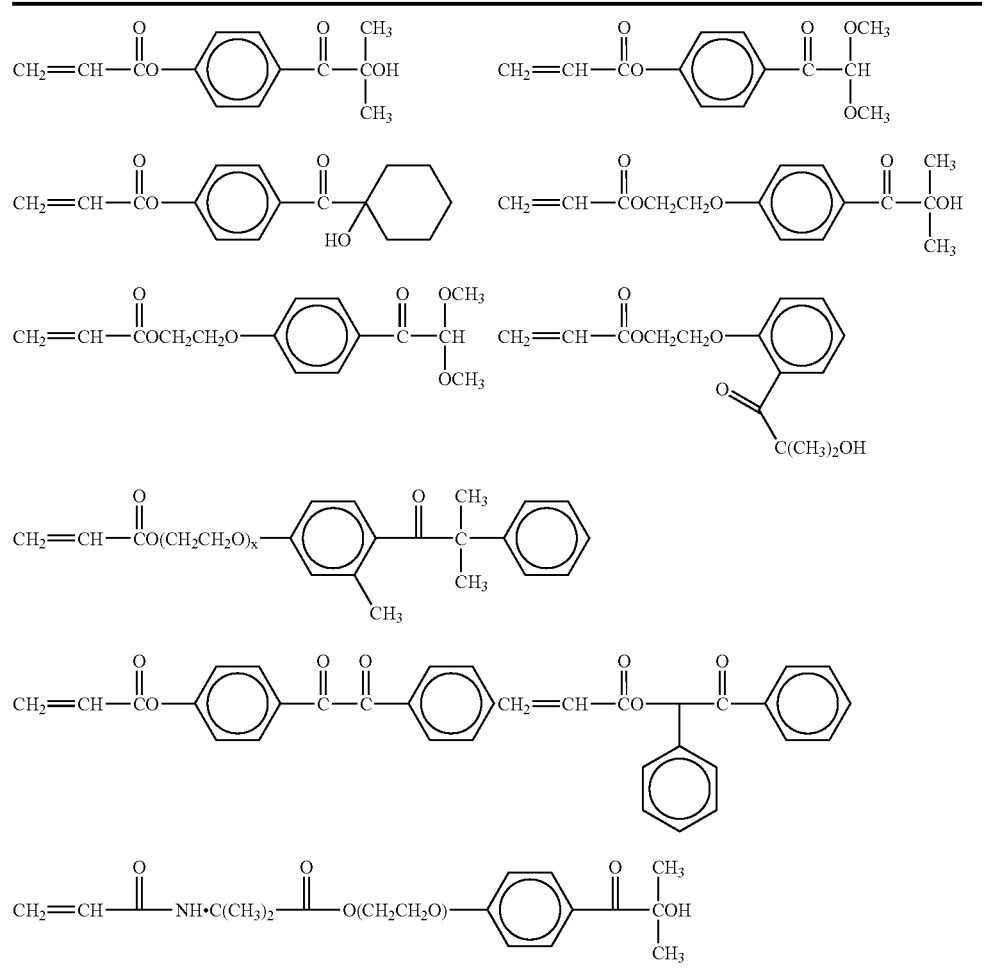

derived from an acetophenone, benzophenone, anthraquinone, 9-fluorene, anthrone, xanthone, thioxanthone, acridone, dibenzosuberone, benzil, or chromone. These aromatic ketones can be substituted with any functional group that is not a nucleophile. Useful functional groups include alkyl, alkoxy, aryl, dialkylamino, halo, nitro, and cyano groups. Thus the monoacryl compounds having a photoinitator group may comprise a hydrogen abstracting group.

Preferred P* groups include those derived from an acetophenone, benzophenone, anthraquinone, thioxanthone, chromone, and benzil. Particularly preferred are benzophenone and anthraquinone.

A variety of monoacryl compounds having a photoinitiator group (such as those of Formula VII) can be made by reacting 1) an ethylenically unsaturated monomer comprising a first reactive functional group ("functional acryl compounds") with 2) a compound that comprises a photoinitiator group and second reactive functional group, the two functional groups being co-reactive with each other. Preferred co-reactive compounds are Michael-reactive ethylenically unsaturated aliphatic, cycloaliphatic, and aromatic compounds having up to 36 carbon atoms, optionally one or more oxygen and/or nitrogen atoms, and at least one reactive functional group. When the first and second functional groups react, they form a covalent bond and link the co-reactive compounds to form the monoacryl compounds having a photoinitiator group.

Representative examples of photoinitiator co-reactive compounds include functional group-substituted compounds such as 1-(4-hydroxyphenyl)-2,2-dimethoxyethanone, 1-[4-(2-hydroxyethyl)phenyl]-2,2-dimethoxyethanone, (4-isocyanatophenyl)-2,2-dimethoxy-2-phenylethanone, 1-{4-[2-(2,3-epoxypropoxy)phenyl]}-2,2-dimethyl-2-hydroxyethanone, 1-[4-(2-aminoethoxy) phenyl]-2,2-dimethoxyethanone, and 1-[4-(carbomethoxy) phenyl]-2,2-dimethoxyethanone. Such photoinitiator monomers (and polymeric photoinitiators derived therefrom) are described, for example, in U.S. Pat. No. 5,902,836 (Babu et al.) and U.S. Pat. No. 5,506,279 (Babu et al.), the disclosures of which are herein incorporated by reference.

It will be understood, with respect to the above description, that the photoinitiator group may be incorporated into the Michael adduct in at least two ways: the "direct method" whereby a monoacryl compound having a photoinitiator groups is polymerized (by Michael addition) with the other components to produce the Michael addition polymer, or the "indirect method" whereby the Michael addition polymer is provided with 1) monoacryl compounds having a reactive functional group ("functional acryl compounds"), which are subsequently functionalized with 2) a photoinitiator compounds having a co-reactive functional group to produce the monoacryl compound having a photoinitiator group.

Examples of useful reactive functional groups include hydroxyl, amino, oxazolinyl, oxazolonyl, acetyl, acetonyl, carboxyl, isocyanato, epoxy, aziridinyl, acyl halide, and cyclic anhydride groups. Where the pendent reactive functional group is an isocyanato functional group, the co-reactive functional group preferably comprises a amino, carboxyl, or hydroxyl group. Where pendent reactive functional group comprises a hydroxyl group, the co-reactive functional group preferably comprises a carboxyl, isocyanato, epoxy, anhydride, acyl halide, or oxazolinyl group. Where the pendent reactive functional group comprises a carboxyl group, the co-reactive functional group preferably comprises a hydroxyl, amino, epoxy, vinyloxy, or oxazolinyl group.

Where the monoacryl component comprises a photoinitiator group, such as those shown in Table 1, the composition may comprise a Michael donor component, a polyacryl component, and a monoacryl component comprising a photoinitiator group.

Where the Michael donor component comprises a photoinitiator group, such as an acetoacetylated photoinitiator, the composition may comprise "functional monoacryl compounds" instead of the monoacryl compound having a pendent photoinitiator group. These functional groups of the monoacryl component terminate the Michael adduct and may be used for further reaction or modification of the Michael adduct. Thus the curable composition may comprise a Michael donor component comprising a pendent photoinitiator group, a polyacryl component, and a functional acryl component.

Useful functional acryl compounds include those acryl compounds that undergo a Michel addition and further include a functional group capable of further reaction, such as a hydroxyl, amino, azlactone, oxazolinyl, 3-oxobutanoyl (i.e., acetoacetyl), carboxyl, isocyanato, epoxy, aziridinyl, acyl halide, vinyloxy, or cyclic anhydride group.

Representative hydroxyl group-substituted functional monomers include the hydroxyalkyl acrylates and hydroxyalkyl acrylamides such as 2-hydroxyethyl acrylate, 2-hydroxypropyl acrylate, 3-chloro-2-hydroxypropylmethyl acrylate, 2-hydroxyethyl acrylamide, 4-hydroxycyclohexyl acrylate, 3-acryloyloxyphenol, 2-(4-acryloyloxyphenyl)-2-(4-hydroxyphenyl)propane (also called bisphenol A monoacrylate), 2-propyn-1-ol, and 3-butyn-1-ol.

Representative amino group-substituted functional monomers include 2-methyl aminoethyl acrylate, 3-aminopropyl acrylate, 4-aminocyclohexyl acrylate, N-(3-aminophenyl) acrylamide, N-acryloylethylenediamine, and 4-aminophenyl-4-acrylamidophenylsulfone.

Representative azlactone group-substituted functional monomers include: 2-ethenyl-1,3-oxazolin-5-one; 2-ethenyl4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-3-oxa-1-aza[4.5] spirodec-1-ene-4-one; 2-ethenyl-5,6-dihydro-4H-1,3-oxazin-6-one; 2-ethenyl-4,5,6,7-tetrahydro-1,3-oxazepin-7-one; 2-isopropenyl-5,6-dihydro-5,5-di(2-methylphenyl)-4H-1,3-oxazin-6-one; 2-acryloyloxy-1,3-oxazolin-5-one; 2-(2-acryloyloxy)ethyl-4,4-dimethyl-1,3-oxazolin-5-one; 2-ethenyl-4,5-dihydro-6H-1,3-oxazin-6-one; and 2-ethenyl-4,5-dihydro-4,4-dimethyl-6H-1,3-oxazin-6-one.

Representative oxazolinyl group-substituted functional monomers include 2-vinyl-2-oxazoline, 2-isopropenyl-2-oxazoline, 2-(5-hexenyl)-2-oxazoline, 2-acryloxy-2-oxazoline, 2-(4-acryloxyphenyl)-2-oxazoline, and 2-methacryloxy-2-oxazoline.

Representative acetoacetyl group-substituted functional monomers include 2-(acetoacetoxy)ethyl acrylate.

Representative carboxyl group-substituted functional monomers include acrylic acid, 3-acryloyloxy-propionic acid, 4-acryloyloxy-butyric acid, 2-acryloyloxy-benzoic acid, 3-acryloyloxy-5-methyl benzoic acid, 4-acryloyloxymethyl-benzoic acid, phthalic acid mono-[2-acryloyloxy-ethyl]ester, 2-butynoic acid, and 4-pentynoic acid.

Representative isocyanate group-substituted functional monomers include 2-isocyanatoethyl acrylate, 3-isocyanatopropyl acrylate, 4-isocyanatocyclohexyl acrylate, 4-isocyanatostyrene, 2-methyl-2-propenoyl isocyanate, 4-(2-acryloyloxyethoxycarbonylamino) phenylisocyanate, allyl 2-isocyanatoethylether, and 3-isocyanato-1-propene.

Representative epoxy group-substituted functional monomers include glycidyl acrylate, thioglycidyl acrylate, 3-(2,3-epoxypropoxy)phenyl acrylate, 2-[4-(2,3-epoxypropoxy) phenyl]-2-(4-acryloyloxy-phenyl)propane, 4-(2,3-epoxypropoxy)cyclohexyl acrylate, 2,3-epoxycyclohexyl acrylate, and 3,4-epoxycyclohexyl acrylate.

Representative aziridinyl group-substituted functional monomers include N-acryloylaziridine, 2-(1-aziridinyl) ethyl acrylate, 4-(1-aziridinyl)butyl acrylate, 2-[2-(1-aziridinyl)ethoxy]ethyl acrylate, 2-[2-(1-aziridinyl)ethoxycarbonylamino]ethyl acrylate, 12-[2-(2,2,3,3-tetramethyl-1-aziridinyl)ethoxycarbonylamino]dodecyl acrylate, and 1-(2-propenyl)aziridine.

Representative acyl halide group-substituted functional monomers include acryloyl chloride, α-chloroacryloyl chloride, acryloyloxyacetyl chloride, 5-hexenoyl chloride, 2-(acryloyloxy)propionyl chloride, 3-(acryloylthioxy) propionoyl chloride, and 3-(N-acryloyl-N-methylamino)propionoyl chloride.

Representative vinyloxy group-substituted functional monomers include 2-(ethenyloxy)ethyl acrylate, 3-(ethynyloxy)-1-propene, 4-(ethynyloxy)-1-butene, and 4-(ethenyloxy)butyl-2-acrylamido-2,2-dimethylacetate.

Representative anhydride group-substituted functional monomers include maleic anhydride, acrylic anhydride, itaconic anhydride, 3-acryloyloxyphthalic anhydride, and 2-acryloxycyclohexanedicarboxylic acid anhydride.

Preferred ethylenically unsaturated compounds having a reactive functional group ("functional acryl compounds") include hydroxyalkyl acrylates such as 2-hydroxyethyl acrylate and 2-(2-hydroxyethoxy)ethyl acrylate; aminoalkyl acrylates such as 3-aminopropyl acrylate and 4-aminostyrene; oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl (meth)acrylate and 4-isocyanatocyclohexyl (meth)acrylate; epoxy-substituted compounds such as glycidyl (meth)acrylate; aziridinyl-substituted compounds such as N-acryloylaziridine and 1-(2-propenyl)-aziridine; and acryloyl halides such as (meth) acryloyl chloride.

A suitable catalyst for the Michael reaction is a base of which the conjugated acid preferably has a $pK_a$ between 12 and 14. Examples of such bases are 1,4-dihydropyridines, methyl diphenylphosphane, tetramethylguanidine, methyl di-p-tolylphosphane, 2-allyl-N-alkyl imidazolines, tetra-t-butylammonium hydroxide, DBU (1,8-diazabicyclo[5.4.0] undec-7-ene) and DBN (1,5-diazabicyclo[4.3.0]non-5-ene), potassium methoxide, sodium methoxide, sodium hydroxide, and the like. Most preferably used bases are organic. Highly preferred catalyst DBU and tetramethylguanidine. The amount of catalyst used in a curable composition in accordance with the present invention is preferably between 0.05% by weight and 2% by weight more preferably between 0.1% by weight and 1.0% by weight.

Preferably, a curable composition in connection with the present invention is prepared by mixing two parts together. One part contains the catalyst and the other contains the reactants, i.e. the polyacryl component, the Michael donor component, and the monoacryl component. Although it is also possible to have the catalyst together with one of the reactants in one part and having the other reactants in the other part, these embodiments generally produce inferior results. The extent of this reaction will generally depend on the kind of catalyst and reactants used.

The stoichiometry of the reactants is based not on molar amounts of the components, but molar functional group equivalents. For example, a compound of Formula I such as methylacetoacetate has two protons alpha to both of the carbonyl groups, and so can react with two acryl groups. Thus methylacetoacetate has two functional group equivalents. In general, the ratio of Michael donor functional group equivalents ("donor equivalents") to Michael acceptor functional group equivalents ("acceptor equivalents") is less than 2:1, more preferably less than 1.5:1 and most preferably less than 1.1:1.

The amount of monoacryl component is generally less than or equal to the difference between the amount of Michael donor functional group equivalents to Michael acceptor functional group equivalents. Most preferably, donor equivalents≧acceptor equivalents+monoacryl component. For example where the ratio of donor equivalents to acceptor equivalents is less than 2:1, the amount of monoacryl component is 1 equivalents or less. Where the ratio of donor equivalents to acceptor equivalents is less than 1.5:1, the amount of monoacryl component is 0.5 equivalent or less. Where the ratio of donor equivalents to acceptor equivalents is less than 1.1:1, the amount of monoacryl component is 0.1 equivalents or less.

The Michael addition polymers produced may be represented by the formula:

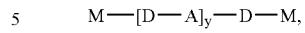

wherein M is the residue of monoacryl compound having a photoinifiator group, (such as is represented by Formula VII);

D is the residue of a Michael donor component (such as represented by Formulas I, II or III), which may be further substituted by one or more ethylenically unsaturated polymerizable group, such as an allyl group, a vinyl group or a methacrylate group (each normally unreactive in a Michael addition), or alternatively, may be further substituted by a photoinitiator group;

A is the residue of a polyacryl component, (such as is represent by Formula V), and y is at least 1.

It will be understood that the above formula represents the simplest case where each of the donor and acceptor components has two functional equivalents. It will be further understood that M and/or D comprise a photoinifiator group. More complex structures where the donor or acceptor component have a functional equivalent of more than two may also be produced and are within the scope of the invention. For example, where the polyacryl component A is trivalent, the Michael addition polymers include those of the formula:

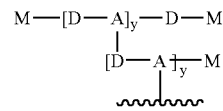

where D, A, y, and M are as previously described.

Where D is trivalent (i.e. having three acryl groups), the Michael addition polymers include those of the formula:

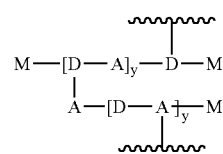

In some embodiments, the polymers produced from the Michael reaction (the Michael adduct) of the donor component, the polyacryl component and the monoacryl component may have the general structure:

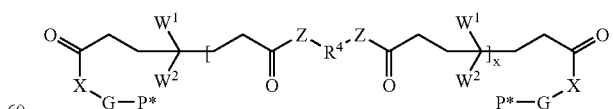

wherein $W^1$ and $W^2$ each independently selected from a cyano group, a nitro group, an alkyl carbonyl group, an alkoxy carbonyl group, an aryl carbonyl group, an aryloxy carbonyl group, an amido group, and a sulphonyl group;

each Z independently represents —S—, —O—, —NH—, or —NR$^5$—, where each R$^5$ independently represents H, an alkyl group having from 1 to 6 carbon atoms;

R$^4$ is a polyvalent organic group;

X is —O— or —NR$^9$—;

G is a covalent bond, $(CH_2)_d$, or $(CH_2)_dO$ where d is an integer from 1 to 4, preferably from 1 to 2;

P* is the residue of a photoinitiator group, such as those of Formula VI;

and x is at least 1.

Where the Michael donor component is further substituted by one or more ethylenically unsaturated, free-radically polymerizable group, such as an allyl group, a vinyl group or a methacrylate group (each normally unreactive in a Michael addition), the Michael addition polymer formed in the Michael reaction may be crosslinked by photopolymerization of the pendent, unreacted, polymerizable groups. In another useful embodiment, particularly where the donor component is not so substituted, the Michael addition polymer may be crosslinked by the addition of a crosslinking agent.

The present invention provides a method of preparing a coating comprising combining a Michael donor component, a polyacryl component (the polyacryl component further substituted with one or more ethylenically unsaturated, free-radically polymerizable group), and a monoacryl component, with a basic catalyst to produce a Michael addition reaction product having unreacted, pendent, ethylenically unsaturated free-radically polymerizable groups. At least one of the Michael donor component and the monoacryl component having a photoinitiator group. Subsequently, the unreacted, pendent, free-radically polymerizable groups may be photopolymerized to crosslink the composition.

Alternatively, the present invention provides a method of preparing a coating comprising combining a Michael donor component, a polyacryl component, and a monoacryl component, with a basic catalyst to effect a Michael addition. Subsequently, the Michael adduct may be combined with a crosslinking agent and photopolymerized to effect crosslinking.

Such crosslinking agents may comprise the polyacryl component previously described, or may comprise a polyethylenically unsaturated monomer component. Examples of polyethylenically unsaturated monomers that can be used include, but are not limited to, poly(meth)acrylic-functional monomers such as ethylene glycol di(meth)acrylate, propylene glycol di(meth)acrylate, trimethylolpropane tri(meth)acrylate, 1,6-hexamethylenedioldi(meth)acrylate, pentaerythritol di-, tri-, and tetra(meth)acrylate, and 1,12-dodecanedioldi(meth)acrylate; olefinic-acrylic-functional monomers such as allyl(meth)acrylate, 2-allyloxycarbonylamidoethyl(meth)acrylate, and 2-allylaminoethyl(meth)acrylate; allyl 2-(meth)acrylamido-2,2-dimethylacetate; divinylbenzene; and the like. Other useful crosslinking agents are described U.S. Pat. No. 5,180,756 (Rehmer et al.) incorporated herein by reference.

After the Michael reaction has reached the desired degree of conversion, the Michael product may be further crosslinked (initiated by the photoinitiator groups) by exposure to actinic energy, such as UV radiation, to yield improved final mechanical properties. UV light sources can be of two types: 1) relatively low light intensity sources such as blacklights which provide generally 10 mW/cm$^2$ or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably between 15 and 450 mW/cm$^2$. Where actinic radiation is used to fully or partially crosslink the oligomer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$.

Advantages of the photopolymerization method are that 1) heating the composition is unnecessary; and 2) photoinitiation is stopped completely when the activating light source is turned off, no additional photoinitiator is necessary. If so desired, measuring the refractive index of the composition material especially in bulk can be used to monitor the extent of polymerization. The refractive index changes linearly with respect to conversion. This monitoring method is commonly applied in polymerization kinetics work. See discussions about the method in, for example, G. P. Gladyshev and K. M. Gibov, *Polymerization at Advanced Degrees of Conversion*, Keter Press, Jerusalem (1970).

Curable compositions according to the present invention may be coated on a substrate and at least partially cured to provide a composite article bearing the Michael addition polymer. The Michael addition polymer may be further crosslinked by photopolymerization as previously described. Suitable substrates include, for example, glass (e.g., windows and optical elements such as, for example, lenses and mirrors), ceramic (e.g., ceramic tile), cement, stone, painted surfaces (e.g., automobile body panels, boat surfaces), metal (e.g., architectural columns), paper (e.g., adhesive release liners), cardboard (e.g., food containers), thermosets, thermoplastics (e.g., polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof. The substrate may be a film, sheet, or it may have some other form.

The curable composition may be applied to the substrate by conventional techniques such as, for example, spraying, knife coating, notch coating, reverse roll coating, gravure coating, dip coating, bar coating, flood coating, or spin coating. Typically, the curable composition is applied to the substrate as a relatively thin layer resulting in a dried cured layer having a thickness in a range of from about at least about 60 nm, although thinner and thicker (e.g., having a thickness up to 100 micrometers or more) layers may also be used. Next, any optional solvent is typically at least partially removed (e.g., using a forced air oven), and the polymerizable composition is then at least partially polymerized (i.e., cured) to form a durable coating, for example, as described hereinabove.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

The number average molecular weight ($M_n$) of each composition was determined using gel permeation chromatography.

Table of Abbreviations

| Abbreviation or Trade Designation | Description |
|---|---|
| t-butylAcAc | tertiary-butyl acetoacetate |
| DBU | 1,8-diazabicyclo[5.4.0]undec-7-ene |
| Methyl AcAc | methyl acetoacetate |
| Methacrylate AcAc | 3-oxo-butyric acid ethyl methacrylate ester |
| AIBN | 2,2'-azobis(isobutyronitrile) |
| SR 238 | 1,6-hexanediol diacrylate, available from Sartomer Company, Exton, PA; |
| DAROCUR ZLI-3331 | a photoinitiator, available from Ciba-Geigy, Hawthorne, NY |
| IRGACURE 2959 | 2-hydroxy-1-[4-(hydroxyethoxy)phenyl]-2-methyl-1-propanone, available from Ciba Specialty Chemical Corp, Tarrytown, NY |
| Irg2959 AcAc | See Preparative Example 1 |
| Release Liner | Polyethylene terephthalate liner of 51 micrometers (2 mil) thickness having a silicone coating. |

Preparative Example 1

Preparation of Irg2959 AcAc

A mixture of IRGACURE 2959 (20.00 g, 96 mmol), t-butylAcAc (15.95 g, 101 mmol), and toluene (100 mL) was heated to reflux. The distillate was collected until the temperature of the vapor reached 111° C. The mixture was then cooled, and the remaining solvent was removed under vacuum to give the product as a viscous, yellow oil (93 wt % in toluene).

Examples 1-6

Synthesis of Oligomers

Mixtures of Methacrylate AcAc, Methyl AcAc, Irg2959 AcAc, SR 238, DAROCUR ZLI-3331, and DBU were prepared in glass reaction vessels according to the amounts shown in Table 1. The vessels were sealed and placed in a water shaker bath at 60° C. for 16 hours. The molecular weights as determined by gel permeation chromatography of the oligomers synthesized are shown in Table 1.

TABLE 1

| Example | Methacrylate AcAc (g) | Methyl AcAc (g) | Irg2959 AcAc (g) | SR 238 (g) | DAROCUR ZLI-3331 (g) | DBU (g) | Mw × $10^3$ | Mn × $10^3$ |
|---|---|---|---|---|---|---|---|---|
| 1 | 2.572 | — | — | 2.441 | 0.334 | 0.037 | 10.1 | 3.2 |
| 2 | 2.572 | — | — | 2.576 | 0.167 | 0.037 | 15.2 | 4.1 |
| 3 | 2.573 | — | — | 2.632 | 0.100 | 0.037 | 20.2 | 4.8 |
| 4 | 2.055 | — | 0.800 | 2.711 | — | 0.037 | 12.5 | 4.2 |
| 5 | — | 1.395 | — | 2.576 | 0.167 | 0.037 | 4.9 | 2.2 |
| 6 | — | 1.152 | 0.798 | 2.575 | 0.167 | 0.037 | 4.8 | 2.1 |

Examples 7-10

A sample of the oligomer prepared in either Example 5 or 6 was mixed with SR 295 in a glass reaction vessel. These mixtures were completely mixed until a homogeneous solution was obtained. The compositions are shown in Table 2.

TABLE 2

| Example | Amount of Oligomer from Example 5 (g) | Amount of Oligomer from Example 6 (g) | SR 295 (g) |
|---|---|---|---|
| 7 | 0.588 | — | 0.655 |
| 8 | 0.360 | — | 2.700 |
| 9 | — | 0.496 | 0.586 |
| 10 | — | 0.461 | 3.640 |

Examples 11-18

Free-Radical Crosslinking of Oligomers

Samples (0.5 gram) of the materials generated in Examples 1-4 and 7-10 were individually placed on a Release Liner. A cover sheet of the same Release Liner was placed on top of the sample. UV radiation (Sylvania F40/350 BL) was applied for a period of 15 minutes (about 1200 mJ/cm$^2$ dosage). The cured samples were removed from the liner as stiff films and were found to be insoluble in organic solvents.

What is claimed is:

1. A curable composition comprising:
   a) a Michael donor component
   b) a polyacryl Michael acceptor component, and
   c) a monoacryl component,
   where at least one of said a) or c) components comprises a pendent photoinitiator group, and wherein the molar amount of donor equivalents≧acceptor equivalents+monoacryl component.

2. The composition of claim 1 wherein said monoacryl component comprises a photoinitiator group.

3. The composition of claim 2, wherein said monoacryl compound comprises a hydrogen abstracting group.

4. The composition of claim 3 wherein said hydrogen abstracting group is a moiety derived from an acetophenone, benzophenone, anthraquinone, 9-fluorene, anthrone, xanthone, thioxanthone, acridone, dibenzosuberone, benzil, or chromone.

5. The composition of claim 2 wherein the photoinitiator group is represented by the structure:

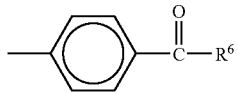

wherein $R^6$ is selected from:

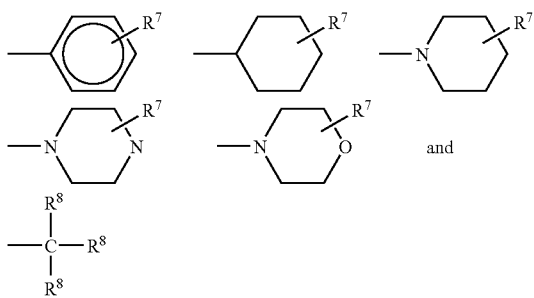

and wherein $R^7$ is H or a $C_1$ to $C_6$ alkyl group,
each $R^8$ is independently a hydroxyl group, a phenyl group, a $C_1$ to $C_6$ alkyl group, or a $C_1$ to $C_6$ alkoxy group.

6. The composition of claim 2 wherein the monoacryl component is of formula:

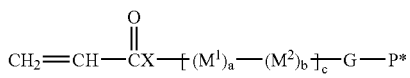

wherein,
X is —O— or —$NR^9$—;
$R^9$ is H or a $C_1$ to $C_4$ alkyl group;
a, b, and c are independently 0 or 1;
$M^1$ is —$C(R^9)_2$— or $Si(R^9)_2$, wherein each $R^9$ is independently H or a $C_1$ to $C_4$ alkyl group;
$M^2$ is O, $NR^9$, C(O), C(O)O, C(O)$NR^9$, or OC(O)$NR^9$, wherein each $R^9$ is independently H or a $C_1$ to $C_4$ alkyl group;
G is a covalent bond, $(CH_2)_d$, or $(CH_2)_dO$ where d is an integer from 1 to 4; and
P* is a photoinitiator group.

7. The composition of claim 1 wherein said Michael donor component corresponds to one of formulas (I) to (III):

$$(W^1—CHR^1—C(O))_x-P \quad (I)$$

$$(W^1—NH—C(O))_x-P \quad (II)$$

$$W^1—CH_2—W^2 \quad (III)$$

wherein
$R^1$ represents hydrogen, an alkyl group or an aryl group;
$W^1$ and $W^2$ each independently selected from a cyano group, a nitro group, an alkyl carbonyl group, an alkoxy carbonyl group, an aryl carbonyl group, an aryloxy carbonyl group, an amido group, and a sulphonyl group;
P represents a mono- or multi-valent organic residue, or the reaction residue of a polyol or polyamine in an acetoacetylation reaction, and
x is an integer of 1 or more, with the proviso that the number of donor equivalents is two or greater.

8. The composition of claim 7, wherein the said Michael donor component is an acetoacetylated poly(alkylene oxide).

9. The composition of claim 7 wherein said Michael donor is of the formula:

$$R^2—CO—CH_2—CO—R^3;$$

wherein $R^2$ and $R^3$; are independently selected from a substituted or an unsubstituted alkyl, an unsubstituted or substituted aryl, a substituted or unsubstituted alkoxy group or a substituted or unsubstituted aryloxy group.

10. The composition of claim 9 wherein said Michael donor is selected from acetylacetone, methylacetoacetate, ethylacetoacetate, methyl malonate, ethyl malonate, and t-butyl acetoacetate.

11. The composition of claim 9, wherein one of $R^2$ and $R^3$ are further substituted by an ethylenically unsaturated polymerizable group.

12. The composition of claim 1, wherein said polyacryl component is of the formula:

$$R^4\text{-}(Z\text{-}C(=O)—CH=CH_2)_z$$

wherein each Z independently represents —S—, —O—, —NH—, or —$NR^5$—, where $R^5$ represents H, or an alkyl group having from 1 to 6 carbon atoms;
$R^4$ independently represents a polyvalent organic group having a valence of z, where z is two or greater.

13. The composition of claim 12 wherein $R^4$ is the residue of a polyol.

14. The composition of claim 1 wherein the ratio of donor equivalents of said Michael donor component to acceptor equivalents of said polyacryl Michael acceptor component is less than 2:1.

15. The composition of claim 1 wherein the ratio of donor equivalents of said Michael donor component to acceptor equivalents of said polyacryl Michael acceptor component is less than 1.5:1.

16. The composition of claim 1 wherein the ratio of donor equivalents of said Michael donor component to acceptor equivalents of said polyacryl Michael acceptor component is less than 1.1:1.

17. A polymer derive from the curable composition of claim 1 of the formula:

$$M—[D—A]_y—D—M,$$

wherein
M is the residue of monoacryl compound having a photoinitiator group;
D is the residue of a Michael donor component, which may be further substituted by one or more ethylenically unsaturated polymerizable group;
A is the residue of a polyacryl component, and y is at least 1.

18. A Michael addition polymer derive from the curable composition of claim 1 of the formula:

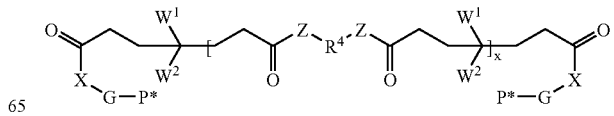

wherein
- $W^1$ and $W^2$ each independently selected from a cyano group, a nitro group, an alkyl carbonyl group, an alkoxy carbonyl group, an aryl carbonyl group, an aryloxy carbonyl group, an amido group, and a sulphonyl group;
- each Z independently represents —S—, —O—, —NH—, or —$NR^5$—, where each $R^5$ independently represents H, an alkyl group having from 1 to 6 carbon atoms;
- $R^4$ is a polyvalent organic group;
- X is —O— or —$NR^9$—;
- G is a covalent bond, $(CH_2)_d$, or $(CH_2)_dO$ where d is an integer from 1 to 4, preferably from 1 to 2;
- P* is a photoinitiator group,
- and x is at least 1.

19. A method for preparing a Michael addition polymer comprising combining the curable composition of claim 1 with a basic catalyst to produce a Michael addition reaction product.

20. The method of claim 19 wherein the catalyst is used in amounts of 0.05% to 2% by weight.

21. The method of claim 19 wherein the Michael addition reaction product comprises one or more photoinitiator groups and a plurality of unreacted, ethylenically unsaturated polymerizable groups.

22. The method of claim 21 further comprising the step of photopolymerizing said ethylenically unsaturated polymerizable groups to crosslink the Michael addition reaction product.

23. The method of claim 19 comprising the step of combining the Michael addition product with a crosslinking agent, and photopolymerizing said Michael addition reaction product and said crosslinking agent to crosslink the Michael addition reaction product.

24. The method of claim 23 wherein the crosslinking agent is a poly(meth)acryl compound.

25. A composite article comprising a substrate having thereon a coating prepared by at least partially curing the composition of claim 1.

* * * * *

UNITED STATES PATENT AND TRADEMARK OFFICE
CERTIFICATE OF CORRECTION

PATENT NO. : 7,307,106 B2  
APPLICATION NO. : 11/009588  
DATED : December 11, 2007  
INVENTOR(S) : Duane D. Fansler Page 1 of 1

It is certified that error appears in the above-identified patent and that said Letters Patent is hereby corrected as shown below:

Title Page,  
Item [56], under "Other Publications", in the "Rector et al." reference, delete "Actoacetate" and insert -- Acetoacetate --, therefor.

Column 1,  
Line 54, delete "60 ,β-" and insert -- α,β- --, therefor.

Column 5,  
Line 43, after "thereof" insert -- . --.

Column 9,  
Line 3, delete "H or a $C_1$ to $C_4$ alkyl group;" and insert the same on Line 2 after "independently" as continuation of the same paragraph.

Column 12,  
Lines 12-13, delete "2-ethenyl4" and insert -- 2-ethenyl-4 --, therefor.

Column 14,  
Line 9, delete "photoinifiator" and insert -- photoinitiator --, therefor.

Line 24, delete "photoinifiator" and insert -- photoinitiator --, therefor.

Column 20,  
Line 42, in claim 17, delete "derive" and insert -- derived --, therefor.

Line 57, in claim 18, delete "derive" and insert -- derived --, therefor.

Signed and Sealed this

Ninth Day of December, 2008

JON W. DUDAS  
*Director of the United States Patent and Trademark Office*